United States Patent [19]
McCord, Jr.

[11] 3,878,875
[45] Apr. 22, 1975

[54] DOVETAIL FIXTURE

[75] Inventor: Wilfred M. McCord, Jr., Louisville, Ky.

[73] Assignee: Vermont American Corporation, Louisville, Ky.

[22] Filed: May 15, 1974

[21] Appl. No.: 470,196

Related U.S. Application Data
[62] Division of Ser. No. 406,298, Oct. 15, 1973, Pat. No. 3,834,435, which is a division of Ser. No. 275,303, July 26, 1972, Pat. No. 3,800,840.

[52] U.S. Cl. .............. 144/87; 144/144.5; 269/41; 269/87.1
[51] Int. Cl. ............................................. B27f 1/14
[58] Field of Search......... 144/85, 87, 144 R, 144.5; 269/87.1, 41

[56] References Cited
UNITED STATES PATENTS
2,764,191  9/1956  Hartmann ........................... 144/87

*Primary Examiner*—Andrew R. Juhasz
*Assistant Examiner*—W. D. Bray
*Attorney, Agent, or Firm*—Harry B. O'Donnell, III

[57] ABSTRACT

This invention is concerned with dovetail fixtures for clamping and holding orthogonally disposed workpieces and for guiding a cutting tool. A slotted guide member in the form of a comb or template is held against one of the workpieces to guide a router or similar cutting tool as the bit traces the dovetail pattern. A different cutter guiding template is employed herein. In addition novel workpiece locating members are movably attached to both the horizontal and the vertical work-receiving surfaces for spacing workpieces relative to each other during cutting.

1 Claim, 10 Drawing Figures

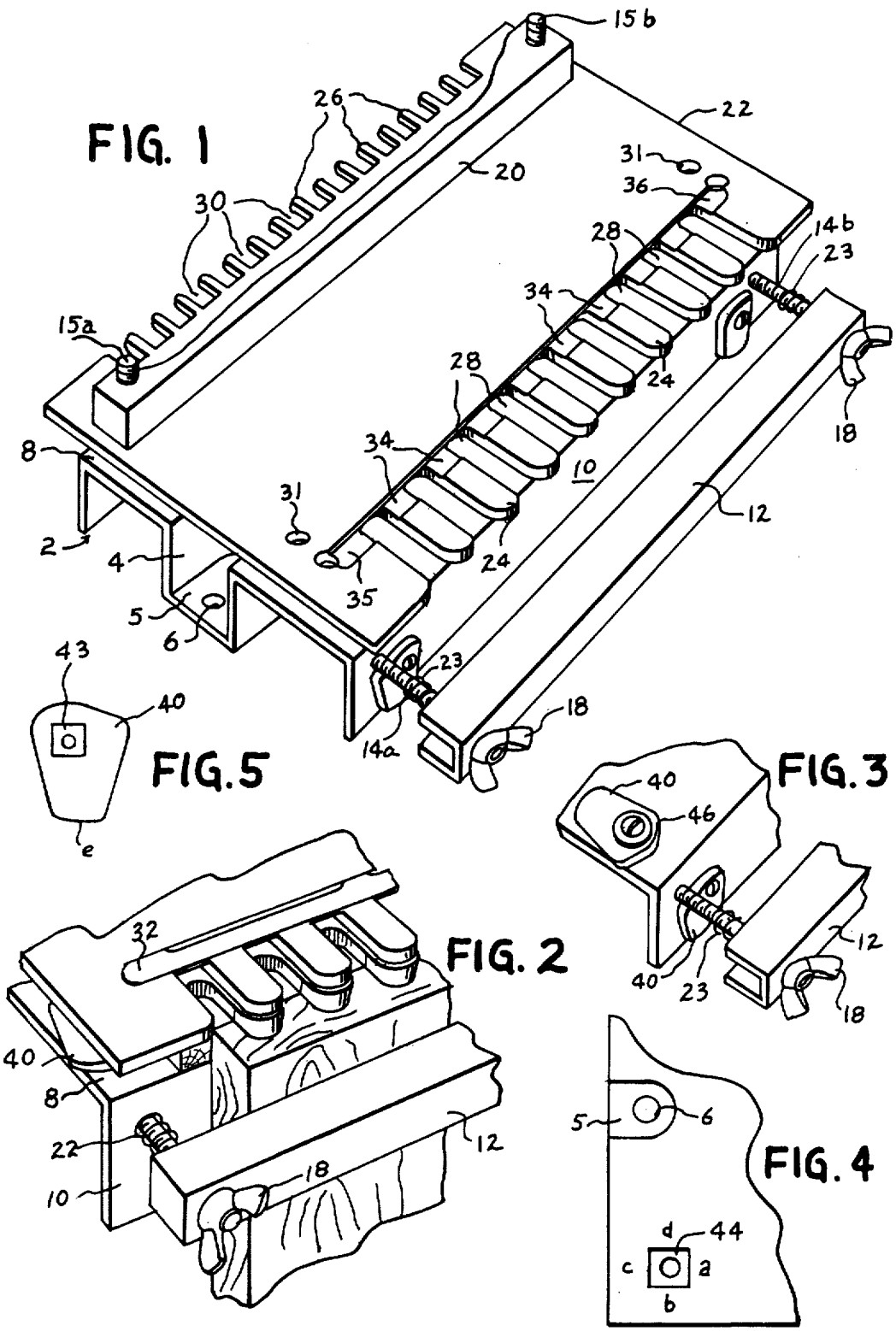

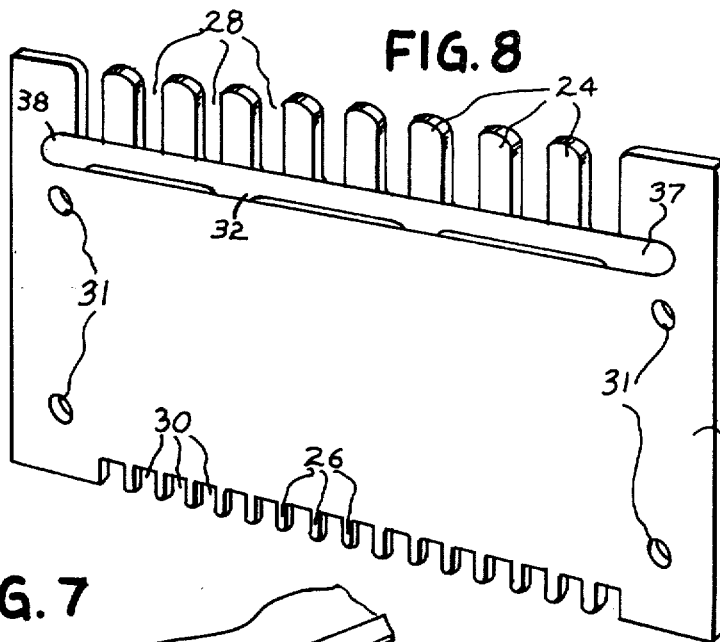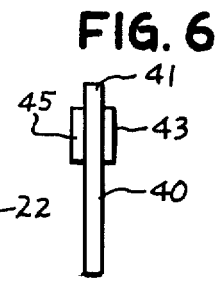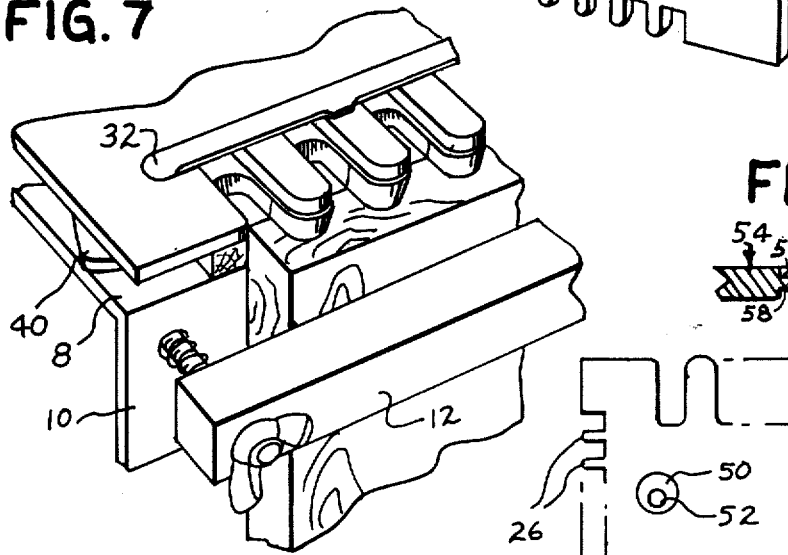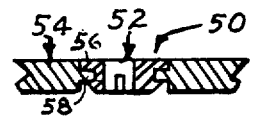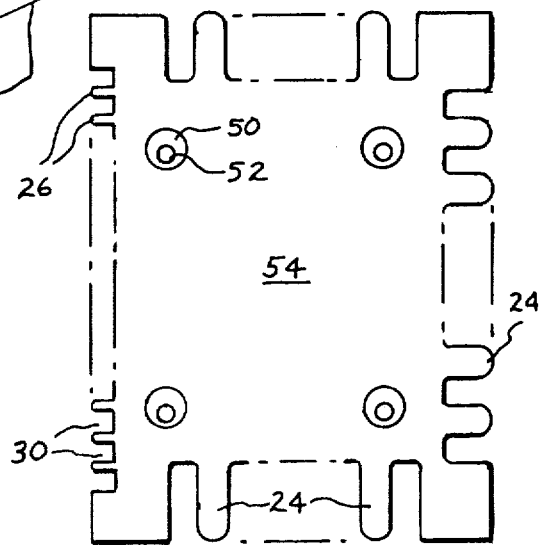

DOVETAIL FIXTURE

This is a division of Ser. No. 406,298, filed Oct. 15, 1973, now U.S. Pat. No. 3,834,435, which is a division of Ser. No. 275,303, filed July 26, 1972 now U.S. Pat. No. 3,800,840.

This invention relates to dovetail fixtures for clamping and holding orthogonally disposed workpieces and for guiding a cutting tool as it cuts interlocking tenons and mortises in the workpieces for effecting dovetail corner joints.

BACKGROUND OF THE INVENTION

Dovetail fixtures of the type envisioned herein are described in U.S. Pat. Nos. 3,109,469, 1,679,074, 3,057,383, 2,764,191 and in other patents. Such fixtures include a horizontal table and a vertical apron equipped with independent clamps by which the two workpieces, such as drawer, box or bookcase sides and the like, can be rigidly held at right angles. A slotted guide member in the form of a comb or template is held against one of the workpieces to guide a router or similar cutting tool as the bit thereof traces the dovetail pattern.

In the shaping of two workpieces of wood in complementary fashion so as to enable them to be subsequently jointed to one another at right angles four types of dovetail joints come into consideration, a one-fourth inch flush joint, a one-half inch flush joint, a one-half inch standard rabbeted joint—one wherein a workpiece has a rabbet formed along all four edges, and a modified one-half inch flush joint—one wherein a workpiece has a rabbet formed along its side edges only. I am not aware of the existence of a dovetail fixture which permits the user to make all four of these joints, while at the same time being sufficiently simple for the amateur or woodworking hobbyist to use.

In most instances the operation of the dovetail fixture is limited to the one-half inch flush joint along with the one-half inch standard rabetted joint. Even then the use of the dovetail fixture is restricted to a prescribed cutting tool. In one such device, the comb or template is made for the rabbeted joint, the cutting tool being guided all the way back in the guide grooves. When a flush joint is to be made the workpiece hold-down clamp bar is moved forward so that the base of the cutting tool hits the bar, preventing the cutting element from traveling the full length of the guide grooves. Obviously the fixture must be matched to the size of the cutting tool. Another such device is described in U.S. Pat. No. 2,764,191. When a standard rabbeted joint is to be made using this device the template is positioned in a forward position in order to cut the upper edge of the vertical workpiece. The nuts are then loosened and the template is pushed rearwardly and again clamped in position. The slotted vertical workpiece is removed from the fixture and the horizontal workpiece is then slotted.

It is obvious that several extra operations are necessary when present dovetail fixtures are to be used in making both flush and rabbeted dovetail joints. A single dovetail fixture with which any of the four conventional dovetail joints described can be cut is thus desirable. Operation should be so simple that even those who have never worked with a dovetail fixture will be able to use it.

SUMMARY OF THE INVENTION

In accordance with the practice of this invention a dovetail fixture for guiding a cutting tool in cutting mortises and tenons is provided which can be simply used in cutting any of the four conventional dovetail joints. The fixture includes a frame equipped with a horizontal work receiving surface and a vertical work receiving surface. The surfaces are adapted to support workpieces in orthogonal positions with the end of a horizontal workpiece in abutting relation with the end of a vertical workpiece. Also included is a first clamping means adapted to clamp the horizontal workpiece against the horizontal work-receiving surface, and a second clamping means adapted to clamp the vertical workpiece against the vertical work-receiving surface in their abutting positions. In a particularly important aspect of the invention a cutter guiding template is employed having one of its edges formed with a first series of guide slots and having a second edge formed with a second series of slots of a different size, the template being adapted to overlie one of the workpieces and to be clamped thereupon in a position such that the outer edges of the fingers are in alignment with the outer surface of the workpiece. In addition, each finger of a given series has a groove thereacross near the inner ends of the entrance slots forming a transverse channel across the fingers adapted to receive and retain a guide band. A guide band adapted to be held in said transverse channel is provided spanning guide slots between fingers. Novel workpiece locating members are movably attached to both the horizontal and the vertical work-receiving surfaces for spacing workpieces relative to each other during cutting.

DETAILED DESCRIPTION OF THE INVENTION

The fixture of this invention has the advantage that it is independent of the cutting tool in the sense that any of the routers in use can be used with the dovetail fixture. Because of its simplicity and, hence ease of manufacture, it can also be modestly priced. In order fully to appreciate the versatility and operation of the dovetail fixture reference will be made to the accompanying drawings. For the purpose of illustration, a preferred form of the invention has been shown.

FIG. 1 is a perspective view showing the entire dovetail fixture of the invention.

FIG. 2 is a partial perspective view of one end of the fixture of the invention showing the workpieces.

FIG. 3 is a partial perspective view showing the workpiece locating members.

FIG. 4 is a top view of the horizontal work-receiving surface showing how the workpiece locating members are positioned.

FIG. 5 is a top view of a workpiece locating member.

FIG. 6 is an view of a workpiece locating member.

FIG. 7 is a view similar to FIG. 2 but showing a different variation.

FIG. 8 is a view of a template of the invention.

FIG. 9 is a view of another template of the invention.

FIG. 10 is a partial cross-sectional view of a plastic insert for the template.

In the drawings 2 represents a frame or body provided with recess or well 4, plate 5 and bolthole 6 so that the fixture can be bolted or otherwise clamped to a table, workbench or other rigid support. Frame 2 is provided with a flat horizontal work-receiving surface 8 and a plane vertical work-receiving surface 10, which in the embodiment shown, is integral therewith. The work-receiving surfaces are so disposed, either connected or unconnected, that horizontal surface 8 lies at right angles to the vertical surface. Frame 2 desirably will be molded or cast using plastic, metal or reinforced plastic such as fiberglass, although other modes of manufacture are also available.

Workpieces are clamped to their respective work-receiving surfaces by clamping members. Seated in threaded sockets or otherwise secured to work-receiving surfaces are studs, 14a and 14b being mounted in vertical work-receiving surface 10, and 15a and 15b in horizontal work-receiving surface 8. The studs are in pairs to receive work-clamping members, such as clamping bars 12 and 20. The studs generally are in the form of clamping bolts, extending perpendicular to the work-receiving surfaces and threaded to receive hand-nuts or wing-nuts 18. Through holes 31 the template 22 is also held by studs 15a and 15b. Clamping bars 12 and 20 are identical and they are biased against the undersides of hand-nuts 18 by coil springs 23 interposed between the work-receiving surfaces and their respective clamping bars. Coil springs 23 thus tend to suitably space the clamp bars, and the template, from the work-receiving surfaces to facilitate inserting and removing workpieces when the hand-nuts are loosened.

In order more fully to understand the outstanding features of this invention, its operation should now be considered. One of the workpieces, such as a drawer front, is clamped to the horizontal work-receiving surface and the second workpiece, say a drawer side, is clamped to the vertical work-receiving surface. The workpieces thus are disposed at exactly right angles to each other, with the outer end of the drawer front flush with the inside face of the drawer side, the inside face of the vertical drawer side thereby overlapping the outside edge of the horizontal drawer front. Except that they are offset as will be described, the upper face of the drawer front is in the same plane as the upper end of the drawer side. Clamping bars 12 and 29 rigidly clamp and hold the two workpieces in their orthogonal positions while a routing tool cuts interlocking tenons and mortises, for effecting a dovetail corner joint. Slots in a comblike guide member or template 22 support and guide the routing tool as the cuts are being made.

One of the features of this invention is the provision of a unique template. With the single template all four of the standard cuts now used in creating dovetail joints can be made. Moreover, using the principles of the invention a dovetail fixture can be designed making any four cuts desired. The template 22 is best seen in FIG. 8. As can be seen the plate, which will be fabricated of rigid plastic, reinforced plastic or metal, along two of its edges, carries two sets of fingers 24 and 26 formed by slots 28 and 30 respectively. Normally the template will be rectangular. Desirably therefor the fingers will be along opposite edges. This need not be so if a square template is used. Considering each edge separately, the entrance or guide slots are all the same length and breadth. The fingers are also all the same length and breadth, and hence are spaced equidistantly from center to center. The pitch, i.e. the distance from the center of one finger to the center of an adjacent finger, of fingers 26 is smaller than the pitch of fingers 24. In addition, fingers 26 are shorter than fingers 24. This is due to the fact that the pitch of guide slots 30, distance from center to center, and the depth of the guide slots, from finger tip to the base of the finger, are less than the pitch and depth of guide slots 28. It can be seen, therefore, that since during the cutting operation the tool is passed down the series of guide slots in the guide member, two different size dovetails can be cut. Normally, the pitches and depths of the guide slots 30 will be such that a one-fourth inch dovetail will be cut for a flush dovetail joint. One-fourth inch dovetail joints genrally are not rabbeted. One-half inch dovetail cuts will be made using guide slots 28.

Another of the features of this invention is that a dovetail joint with a rabbet formed along its side can be cut using the same dovetail fixture. This will become clear from a description of guide band 32, best shown in FIG. 8. The guide band is missing from the device illustrated in FIG. 1. As is apparent from FIG. 1, extending across each finger is a depression or groove 34. Grooves 34 are formed in fingers 24 at or near the base of the fingers, in other words near the inner ends of entrance slots 28, and the grooves are in alignment linearly to form a transverse channel across all of the fingers into which guide band 32 snugly fits. Desriably edges 35 and 36 on each side of guide slots 28 have the groove in them so that ends 37 and 38 of guide band 32 seat therein. If desired clip means can be employed to hold guide band 32 more securely in its channel. Spring clips are particularly useful if the bottom of the channel is not flat. However in the case of a friction fit the guide band is received and retained in the channel without need for clip means.

Reverting now to dovetail joint sizes, with guide band in the channel as shown in FIG. 2 a one-half inch dovetail will be cut for a flush dovetail joint. The dovetail fixture of the invention thus is readily sutited to the cutting of the two conventional flush dovetail joints. It is understood, of course, that the second workpiece, the vertically positioned panel, using the device as it is illustrated, will be offset in the usual manne. In other words the vertical workpiece will be offset from the side edge of the horizontal workpiece by a distance equal to one-half the pitch of the grooves. This ensures that when the workpieces are subsequently jointed together in a dovetail joint, the adjoining edges of the workpieces will be flush with each other. The offsetting of the workpieces is effected by workpiece locating members or gages, to be described, so that dovetail tenons are cut in the end of one workpiece, and by the same operation corresponding mortises are cut in the end of the other workpiece. In the case of the flush joint the offset is one-half of the pitch, rabbeted joints being offset one-half ± the depth of the rabbet.

In addition to the one-fourth inch and one-half inch flush joints two rabbeted joints are frequently desired. One is a so-called standard rabbeted joint used in drawers wherein the drawer end is made with a three-eighths inch rabbet formed along all four sides. With this drawer end on the horizontal work-receiving surface the mortises and tenons are cut using slots 28, and with guide band 32 removed as seen in FIG. 1. The width of guide band 32, when positioned in its channel as shown in FIG. 2 is three-eighths of an inch. The removal of the guide band thus permits the cutting tool to be passed down the series of slots 28 all the way to their ends instead of being stopped three-eighths of an inch away by guide band 32. The joint is a one-half dovetail joint with a three-eights inch rabbet on all sides.

Another rabbeted dovetail joint is a so-called modified flush joint. This is also a one-half inch dovetail joint. In this joint the two workpieces, when joined together are flush with each other at the top and bottom of the joint. There is, however, a one-sixteenth inch rabbet on the sides. This joint is cut with guide band 32 positioned in its channel as shown in FIG. 7. Referring to FIG. 7 it can be seen that in one or more of the finger grooves 34, and desirably in edge grooves 35, the width of guide band 32 is equal to the groove width. This is to keep the guide band from sliding and also to hold it in the position shown in FIG. 2. Other holding means such as pins and the like will occur to those skilled in the art. In either event the portions of guide band 32 which span entrance slots 28 are approximately one-sixteenth inch narrower than grooves 34. Comparing FIG. 2 with FIG. 7 it will be seen that in guide slots 28 in FIG. 7 the cutting tool advances one-sixteenth inch further than it does in the guide grooves of the device as shown in FIG. 2.

Inasmuch as the horizontal workpiece and the vertical workpiece are complementarily slotted, it is understood that two sets of workpiece locating members such as positioning blocks 40 must be used. In another of the aspects of this invention it has been discovered that without offsetting the template edge having smaller slots 30, relative to the edge with larger slots 28, and without using a different set of locating members, the workpieces can be properly positioned relative to each other for all four of the cuts described hereinbefore. The workpieces abut positioning surfaces which extend perpendicular to work-receiving surfaces for both left and right side cuts. The distance of these positioning surfaces, or lobes, 41 from the centers of the guide slots must be an even multiple of one-half the pitch of the entrance slots (slots 28 and 30). In case of the guide slots with the smaller pitch (slots 30), a different set of values obtains, normally calling for either a different positioning of the guide slots, or a different set of locating blocks. It has been found, however, that if four lobes or locating surfaces are provided, the proper offset or staggered positions for all four dovetail joints is possible and the proper distance between the locating surfaces and the slots is achieved. Referring to FIG. 6, it can be seen that locating member 40 is provided with a square projection desirably in the form of nut 43, also visible in FIG. 5. Looking now at FIG. 4 and FIG. 5 it is apparent that locating block 40 can be placed in seat or depression 44 so that end *e* extends in any of the directions *a*, *b*, *c*, or *d*. The locating block is held in place by a bolt 46. Thus, four positions are available. Identical locating blocks and seats are positioned on both sides of the horizontal and vertical workpiece-receiving surfaces as shown in FIGS. 1 and 3.

EXAMPLE

Reference is now made to a specific example of the dovetail fixture of the invention. In a device having 9½ inch wide workpiece-receiving surfaces, front and side pieces for 8 inch draweres are inserted for one-half inch flush dovetail joints. The left side of the front piece and left drawer side piece are clamped to their respective work-receiving surfaces, and against locating members 40 on the left side of the unit, by clamping bars 12 and 20. The edge of the horizontal drawer front abuts the drawer side, the top of the end of the drawer side is flush with the top inside surface of the drawer front. The template 22 and its guide band 32 are in the position shown in FIG. 2, and the two left side workpieces are offset by positioning locating members 40. Both the horizontal locating member (FIGS. 4 and 5) and the vertical locating member are positioned with *e* at *c*, in other words the lobe *e* points away from the workpiece. When the right drawer front and the right drawer sides are cut, lobes *e* are again away from the workpieces. In effect the locating member 40 is inverted turning the end *e* through a vertical angle of 180°. For the symmetrical appearance of the drawer the distance between lobes is an even multiple of the pitch. The cutting of the dovetails is effected by means of an ordinary motor driven router, wit a guide bushing to fit slots 28, the router being moved frictionally over template 22. During this operation guide fingers 24 carry the router bit down the series of slots 28 cutting the bevels of the tenons and the grooves of the mortises.

One of the features of the dovetail fixture of this invention is that the symmetry of the locating blocks. The locating blocks are in the form of irregularly shaped discs 40 symmetrical relative to their longest center line so that the same locating members can be used either on the right or on the left side of the workpiece-receiving surfaces. If moved from one side to the other they are merely inverted, projection 45 seating in the depression 44. All four locating members are identical. This is advantageous from the manufacturing point of view.

Another feature of this invention is that of plastic insert 50. This insert is in the form of a circular disc capable of being inserted and retained in a hole in the template (FIG. 9) as shown in FIG. 10. The collar 56 of the insert rests on ring 58 integral with template 54 and the bottom of the inserts projects beyond the ring sufficiently to become locked in the template holes 31. Insert 50 is provided with an eccentric orifice 52 which can be moved slightly in any direction by partially turning or rotating the disc. This slight orifice displacement compensates for any eccentricity between a router bit and its guide bushing, permitting the use of any router.

In the foregoing detailed description of the invention has been set down for the purpose of explanation. Modifications will occur to those skilled in the art. Thus it will be appreciated that guide band 32 can be eliminated. Through the use of guide band 32 two cuts can be made besides that possible with the band out as in FIG. 1, i.e. cuts of two different depths, that in FIG. 2 and that in FIG. 7. These same cuts can be made by using two additional sets of guide slots, or comb sides, as shown in FIG. 9. This can be accomplished by a square template having guide slots on each of its four sides. The pitches of the slots on the additional two sides will be the same as that of slots 28 but their depths will be different, being those permitted by guide band 32. In still another embodiment the guide band can be used to eliminate combs. Thus with one comb and a guide band it is possible to make three dovetail joints. In addition, instead of projection nuts, locating members 40 can be positioned by pins, ridges, and the like. As another example, the vertical and horizontal work-receiving surfaces need not be integral with each other so long as they are perpendicular. They can move toward and away from each other. Guide slots likewise can be along edges either perpendicular or parallel to each other. And if desired a template having a single edge formed with guide slots in combination with a band can be employed. These and other ramfications of the invention are deemed to be within the scope of this invention.

What is claimed is:

1. In a dovetail fixture of the type employing a template for guiding a cutting tool in cutting mortises and tenons, means for slightly moving said template in any direction to compensate for eccentricity of router bit guide bushings including a circular disc adapted on insertion to fit rotatably within a hole in the template, snap-in retention means holding said insert disc in the template hole, said insert disc having an eccentric orifice therethrough which is moved slightly in any direction on partial rotation of the disc within the hole.

\* \* \* \* \*